Aug. 16, 1949.  W. P. GOEMBEL  2,479,487
JET PROPELLED AIRPLANE WITH WING DISCHARGE SLOT
Filed Jan. 28, 1946  2 Sheets-Sheet 2
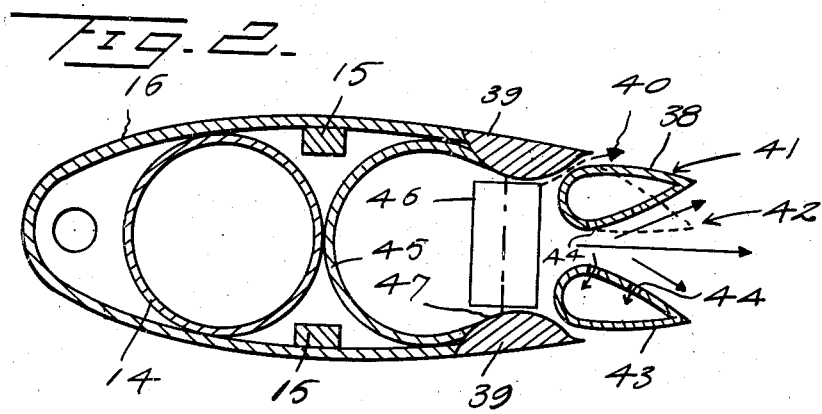
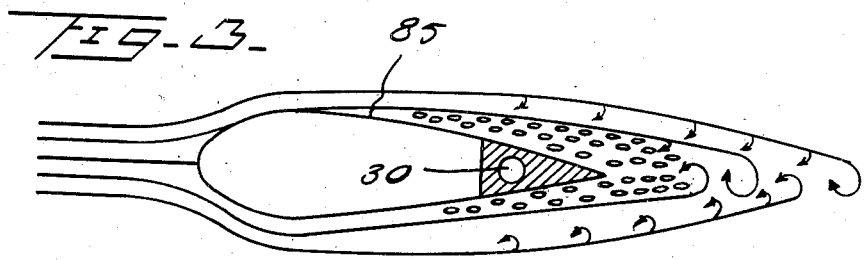
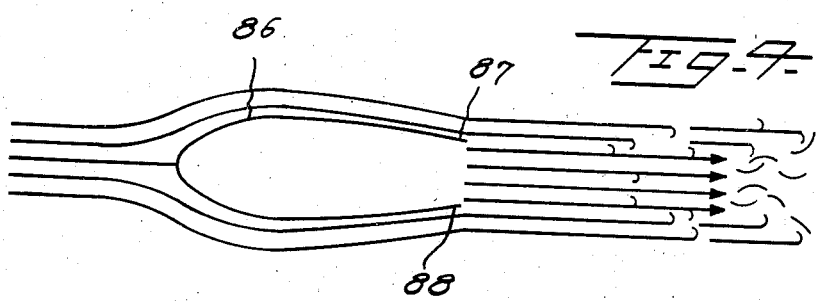
INVENTOR.
William P. Goembel
BY
Kimmel & Crowell ATTORNEYS Patented Aug. 16, 1949

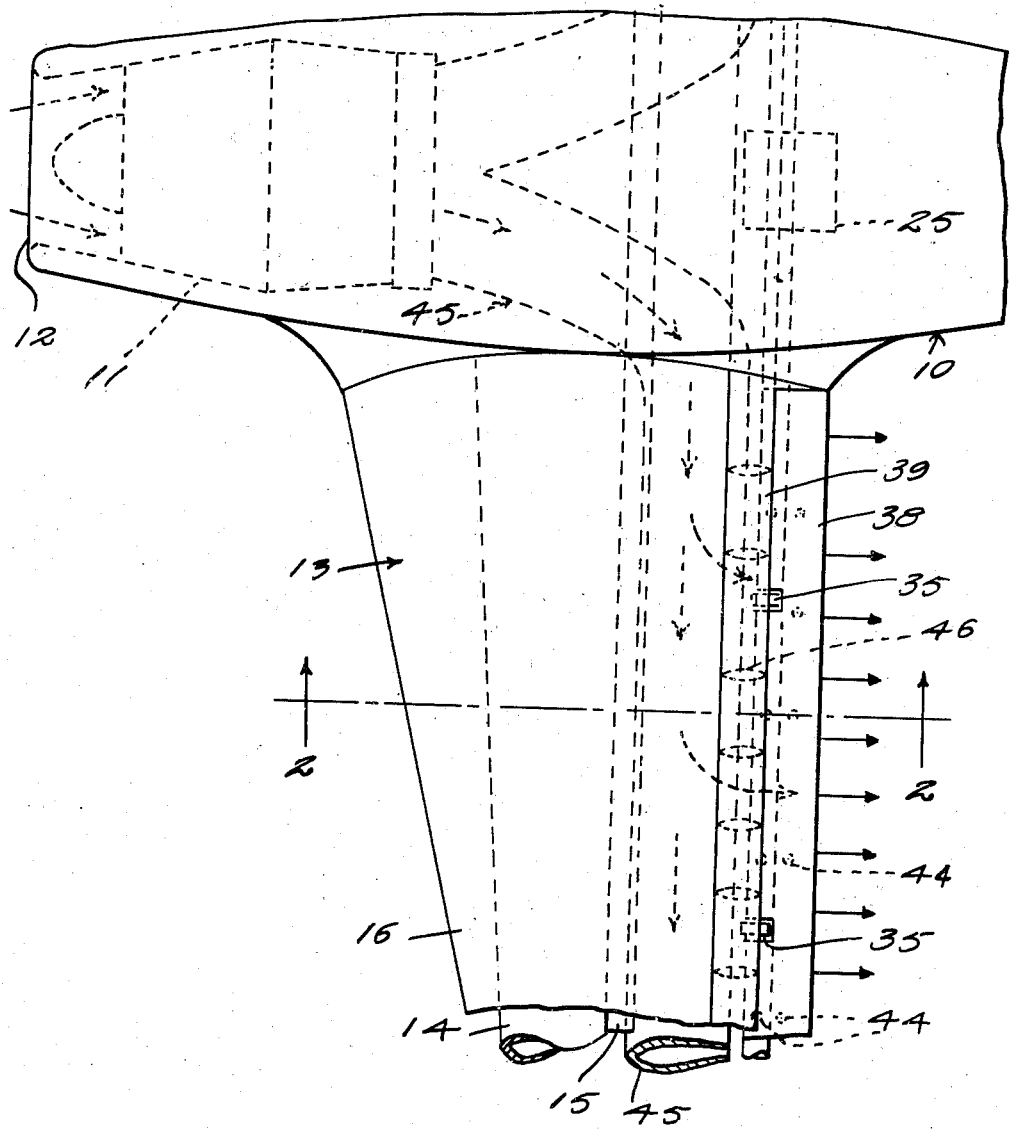

2,479,487

UNITED STATES PATENT OFFICE 2,479,487

JET PROPELLED AIRPLANE WITH WING DISCHARGE SLOT

William Philip Goembel, Baltimore, Md.

Application January 28, 1946, Serial No. 643,871

2 Claims. (Cl. 244—15)

My invention relates to improvements in airplanes and other devices, in combination with jets as propelling, sustaining, controlling, and other means.

The principal object of my invention, among other things, is to provide an improved method of jet propulsion, in aircraft, watercraft or other devices navigable through air or water. For purposes of simplicity of illustration I shall refer herein to aircraft without limiting my invention to such devices. I shall refer to a jet as meaning a fluid jet, the nature of the fluid may be either gaseous or liquidous. In the illustrations given herein of applications to aircraft the jet would be of a gaseous nature as for example, air, or a mixture of air and gases or vapors.

Another object of my invention is to provide a propelling jet in such a manner as to increase the velocity of flow about aerodynamic bodies. This has become well known as a type of "boundary layer control." My invention includes improvements in the aerodynamic bodies in such a manner as to retain their more efficient parts or surfaces.

A further object of my invention is to provide suitable means of controlling the jet, in direction and/or velocity, in such a manner as to increase the usefulness of such a jet.

To the foregoing objects, and others which may hereinafter more fully appear, the invention consists of the novel construction, combination and arrangement of parts, as will be more specifically referred to and illustrated in the accompanying drawings, but it is to be understood that changes, variations, and modifications may be resorted to which fall within the scope of the invention as claimed.

In the drawings:

Figure 1 is a fragmentary plan view of an airplane having jet propulsion wing discharge slots constructed according to an embodiment of my invention, Figure 2 is a sectional view taken on the line 2—2 of Figure 1 and showing the details of wing construction, Figure 3 illustrates air flow about a conventional airfoil, Figure 4 illustrates air flow about an airfoil constructed according to this invention.

It is well known that the forward part or leading edge of an airfoil is more efficient aerodynamically than the after part or trailing edge of the airfoil. It is also well known that the fairing or streamlining of circular tubes greatly reduces the resistance or drag of such tubes in an air stream. This fairing behind a circular tube is simply expressed by saying that a trailing edge section is added. A novelty of this invention is simply expressed by saying that the trailing edge section of airfoils has been eliminated. The history of airfoil development has been influenced by the necessity of greater depth of airfoil at the rear spar location for structural reasons. The trailing edge or the part of airfoil aft of the rear spar location may be considered as a fairing similar to that referred to above, which reduces the drag of airfoil. Another purpose of this fairing of contour, or trailing edge section, is to assist in the downward deflection of the air as it leaves the airfoil. This reduction in drag and this increase in lift by downward deflection, I have accomplished in a new, original and useful manner. I eliminate the less efficient trailing edge section of the airfoil as it is generally known and retain the more efficient forward part. Such a seaming mutilation of an airfoil would leave a very blunt or severed body having high drag. Figure 3 shows the contour 85 of a conventional airfoil. The trailing edge section is shown as cross-hatching and indicated as 30. If the trailing edge section were eliminated then the contour would become that of contour 86 ending at points 87 and 88 of Figure 4.

Figure 3 shows the flow about a conventional airfoil as usually obtained by photographing with smoke in the wind stream. The boundary layer thickens forward of 85 and separation occurs near 85. This leaves a negative pressure or dead air region indicated by small circles; this dead air region indicates high drag especially at high speeds. The inadequacy of the trailing edge of conventional airfoils is here demonstrated. The part that the section 30 plays in filling the dead air space is obviously insufficient.

Figure 4 illustrates my invention at low angles of attack under conditions similar to those in Figure 3. The boundary layer may become slightly thicker between 86 and 87 but separation does not occur. The boundary layer is energized by a suction due to the higher velocity of the jet emitting between 87 and 88, in a manner similar to that in the common injector. In Figure 3 we have in this region a drag producing negative pressure region which is eliminated in Figure 4 by boundary layer energization and a positive pressure reaction jet in combination with an airfoil of new design. With proper velocity distribution, the wake can be controlled to advantage, a smooth wake indicating less drag.

My invention of a jet, from the interior of a wing, supplies the displaced region with air or gas under pressure which reacts against the wing giving a forward thrust and at the same time tending to eliminate the vortices and negative pressure. Thus I have eliminated or greatly reduced the principal source of drag and have in so doing created a thrust which aids propulsion. We now have a wing with thrust instead of drag when the jet is properly applied. For takeoff and climb and high speed with the jet properly applied an airplane equipped with this wing would behave in a manner similar to conventional airplanes, and for the gliding and landing conditions it behaves, without the jet, in a manner similar to a conventional airplane with deflected flaps. If in flight a power failure occurs the pilot has an airplane similar to one with deflected flaps, and is relieved of that operation.

In Figure 4, the contour may represent the forward part of a conventional airfoil, or any suitable airfoil section developed for use in conjunction with an afterbody jet. This combination is a basic part of my invention. The principle of the reaction jet is well understood. The principle is understood that a fast moving stream with slower moving streams on each side induces a flow from the slow streams to the faster stream. The jet being the fastest stream induces a greater velocity of flow about the airfoil, which increases the lift. The reaction of the jet produces a thrust on the airfoil.

Others have suggested the use of a reaction jet of small orifice area having very high pressure and very high velocity and locating the jet at the rear of an aerodynamic body. I improve such a combination by increasing the orifice area and reducing the velocity. This improvement increases the efficiency of the reaction jet. I accomplish this by using a diverging chamber the outlet of which forms an orifice of increased area. I also use other means as revealed hereafter. The reaction jet used by others results in thrust or propulsion. I further improve the reaction jet by controlling it in direction which varies the function from thrust on the device to lift on the device. For example, assuming the device is an airplane in flight, jets used and proposed by others produce thrust and are propelling devices. Their airplanes depend on conventional devices or common airfoils for lift in horizontal, climbing and gliding flight. In horizontal and climbing flight their main jet is functioning principally as a propeller. The source of power is shut off, or nearly so, in gliding flight. In their airplanes the direction of the main jet with respect to the principal axis of the airplane remains fixed. In my jet propelled airplane the direction of the jet does not remain fixed with respect to the principal axis but is adjustable in its direction. This adjustment, when used in conjunction with other parts of the airplane, results in forces being applied in other than the flight direction. Elsewhere in this disclosure I speak of a downward deflection of the main jet as increasing the lift. The downward deflection changes the jet direction with respect to the principal axis of the airplane. Increasing the lift means increasing the vertical force. In this case the increase is due to downward deflection of the air behind the airfoil or aerodynamic reaction, and also due to the action of the jet which increases the mass or volume of the downwash and in so doing the component of the jet reaction, with respect to the axis of the airplane, is increased. If the jet is deflected upward a loss of lift occurs but a corresponding loss of drag or gain in thrust is experienced up to a certain point. The above adjustment or control of the main jet is in some ways analogous to changing the angle of attack through small angles in conventional airplanes; however, as is seen above I accomplish the same results without changing the angle of attack, but by changing the angle of the main jet.

With my high lift devices I get a greater angle of stall and greater lateral control which permits a stalling, power on, glide of very steep descent unlike the power-off glide of jet propelled airplanes used and proposed by others. Jets of very small orifice height, and of small orifice area, have been placed in various locations along the upper contour of conventional airfoils. Note here that my use of the main jet implies a jet of greater orifice area, than has been suggested, and of lower relative velocities, which gives higher jet efficiency.

My invention provides means of controlling the reaction jet in direction and/or velocity. One means, among others, is by the use of movable surfaces. I shall for simplicity herein refer to such movable surfaces as vanes.

The deflection of the jet in a downward direction increases the downwash angle and downwash volume of the wing and deflects downward the lower flow. The upper boundary of the jet becomes more nearly parallel to the upper flow and increases the velocity of the flow over the upper surface, thus increasing the lift. Figures 1 and 2 illustrate my invention of an airfoil in combination with a pumped jet discharging rearward between vanes or surfaces. The fuselage or body of the airplane is generally indicated by the reference numeral 10. It should be understood however, that this invention could be embodied in the type of airplane referred to as a flying wing. That is, an airplane containing all of its equipment and structure within the wing alone. A turbo-jet 11 is contained in the fuselage 10 and is provided with a forwardly facing air intake 12. A turbo-jet engine is shown merely for illustrative purposes since any of the well known devices such as ram jets or air compressors could be substituted without departing from the basic concepts of my invention. A pair of branch conduits or ducts 45 are joined to the exhaust of the engine 11 and bend outwardly to extend along the length of each of the wings 13. The wing 13 is formed, in the embodiment here illustrated, of a main tubular structural member 14, metal skin 16, and upper and lower transverse stiffening members 15. The rear edge of the wing 13 is supported by the spar caps 39 which are joined to the upper and lower trailing edges of the skin 16. A longitudinally extending slot 47 is formed in the rear of the duct 45 and the upper and lower edges of the slot 47 are joined to the adjacent spar caps 39, thus communicating the space between the spar caps with the interior of the duct 45. An upper vane 38, and a lower vane 43 are rockably carried by the upper and lower spar caps 39 respectively. The vanes 38 and 43 are disposed to the rear of the caps 39 and are mounted on the hinge members 35, best seen in Figure 1. For the vanes I prefer an airfoil surface such as shown in Figure 2. It will be noted that there is a space between the upper vane 38 and the surface of member 39 which may be open at all times. This small by-pathed jet 40 aids in delaying separation and energize the upper boundary layer. Moving the vane 38 from position 41 to position 42 deflects the main jet downward. The lower vane 43 on being deflected downward acts very much as a deflected flap without the high drag if the main jet is functioning. Under these conditions the airfoil is more efficient for take-off and climb. The vanes may work in unison or have varying degrees of differential movement. The vanes may be operated manually and/or automatically. The vanes may extend over the entire span or part of the span.

Considering the jet speed as full on at the source, deflecting the upper and lower vanes 38 and 43 in Figure 2 inward would tend to increase the jet velocity, and the speed of the airplane depending on the design. On the other hand it can be stated that deflecting the upper and lower vanes outward in the manner of a diffuser increases the thrust and therefore the speed of the airplane. Either may be true but depending on the design. As an example, assuming the jet mass as constant, if the vanes in the above consideration were long in chord, any great deflection outward with respect to each other would cause excessive drag and regardless of increased jet efficiency the speed of the airplane would be reduced. This condition involves the ability of the jet to follow the walls and the resistance of the vanes when extending too far beyond the airfoil contour.

I include the diffuser in my invention as it is useful in increasing the efficiency of a jet by decreasing the velocity and increasing the pressure. In Figure 2 the inside walls of vanes 38 and 43 act as a diffuser, the efficiency of the diffuser being increased by sucking the boundary layer of the jet into holes 44 through the inner surfaces of the diffuser. This causes the jet to expand much more rapidly and at greater angles than it would in a common diffuser without suction. The jet expansion produces greater thrust. The suction is created by pumps, injectors, or other means indicated by reference numeral 25 in Figure 1.

Figure 2 contour may be that of an airplane wing or the contour of a streamlined structure supporting a landing gear, or any other devices. I mention a landing gear in particular because modern high speed airplanes are quite complicated by the landing gear retraction. My invention of using a jet in combination with such structure results in a thrust and there is no necessity for gear retraction leaving the pilot free of that operation. The construction here disclosed may also be used in place of the conventional fin and rudder or horizontal stabilizer and elevator. The deflection of the vanes 38 and 43 would effect the pitch or yaw of the airplane by directing the jet as desired. The parts 45 are structural members, not necessarily formed as shown, which act as walls of internal ducts. The ducts have openings to allow the escape of the jet and guide vanes as 46 carried by the spar caps 39 to direct and control the jet. Spar caps 39 are structural members of any suitable sectional shape which may be varied to assist in the directing or curving of the fluid flow.

The exact configuration illustrated is regarded as the optimum but some of the desirable results inherent in this disclosure may be obtained by various slight modifications including some departure from the exact configuration shown, and it is, therefore, requested that the scope of the invention should be regarded as limited only by the terms of the claims.

What I claim is:

1. In combination with an airplane, means effecting a relative flow of fluid in said airplane, a wing on said airplane, said wing including upper and lower surfaces having vertically spaced apart trailing edges forming a spanwise opening, vertically spaced upper and lower transverse spar members supporting said wing at said trailing edges, a spanwise extending hollow vane having an airfoil cross section rockably carried by each of said spar members and rearwardly thereof to provide means for varying the height and shape of said opening, a spanwise duct in said wing having one end in communication with said first mentioned means, a longitudinal slot formed in said duct, the edges of said slot engaging said upper and lower spar members whereby said spar members communicate said duct with said spanwise opening, and a plurality of vertically disposed louvers rockably carried at the opposite ends thereof by said spar members for controlling the lateral direction of the fluid flowing from said duct through said spanwise opening.

2. A device as set forth in claim 1 in which the confronting inner surfaces of said hollow vanes are provided with a plurality of chordwise and spanwise spaced apart openings, and means for producing a low pressure is communicated with the interior of said vanes whereby the boundary layer of fluid flowing along the inner surfaces of said vanes will be caused to adhere closely to said inner surfaces.

WILLIAM PHILIP GOEMBEL.

REFERENCES CITED

The following references are of record in the file of this patent:

UNITED STATES PATENTS

| Number | Name | Date |
| --- | --- | --- |
| 1,580,577 | Baumann | Apr. 13, 1926 |
| 1,723,479 | Goodrich | Aug. 6, 1929 |
| 1,764,842 | Jones | June 17, 1930 |
| 1,772,196 | Wallace | Aug. 5, 1930 |
| 1,775,757 | Gay | Sept. 16, 1930 |
| 1,837,901 | Fottinger | Dec. 22, 1931 |
| 2,041,791 | Stalker | May 26, 1936 |
| 2,075,817 | Loerke | Apr. 6, 1937 |
| 2,380,535 | McDevitt | July 31, 1945 |
| 2,388,247 | Berkow | Nov. 6, 1945 |
| 2,396,911 | Anxionnaz | Mar. 19, 1946 |
| 2,408,788 | Ludington | Oct. 8, 1946 |
| 2,420,323 | Meyer | May 13, 1947 |
| 2,430,431 | Lanier | Nov. 4, 1947 |

FOREIGN PATENTS

| Number | Country | Date |
| --- | --- | --- |
| 325,002 | Great Britain | Feb. 10, 1930 |
| 390,363 | Great Britain | June 6, 1933 |
| 427,017 | Great Britain | Jan. 9, 1934 |
| 504,539 | Great Britain | Apr. 26, 1939 |
| 518,663 | Great Britain | Mar. 5, 1940 |
| 865,393 | France | Feb. 24, 1941 |
| 877,590 | France | Sept. 7, 1942 |